(12) United States Patent
Lipohar et al.

(10) Patent No.: US 11,246,680 B2
(45) Date of Patent: Feb. 15, 2022

(54) ORTHODONTIC APPLIANCE

(71) Applicant: Betaline Orthodontics Pty Ltd, Blackburn South (AU)

(72) Inventors: Jian Guang Lipohar, Nunawading (AU); Edward Lipohar, Nunawading (AU); Reuben Lipohar, Nunawading (AU)

(73) Assignee: Betaline Orthodontics Pty Ltd, Blackburn South (AU)

( * ) Notice: Subject to any disclaimer, the term of this patent is extended or adjusted under 35 U.S.C. 154(b) by 47 days.

(21) Appl. No.: 16/625,036

(22) PCT Filed: Feb. 26, 2018

(86) PCT No.: PCT/AU2018/050161
§ 371 (c)(1),
(2) Date: Dec. 20, 2019

(87) PCT Pub. No.: WO2018/232441
PCT Pub. Date: Dec. 27, 2018

(65) Prior Publication Data
US 2020/0214804 A1    Jul. 9, 2020

(30) Foreign Application Priority Data
Jun. 20, 2017  (AU) .................. 2017902357

(51) Int. Cl.
*A61C 7/10*     (2006.01)
*A61C 7/00*     (2006.01)
(Continued)

(52) U.S. Cl.
CPC .................. *A61C 7/10* (2013.01); *A61C 7/00* (2013.01); *A61C 7/002* (2013.01); *A61C 7/08* (2013.01); *A61C 7/36* (2013.01)

(58) Field of Classification Search
CPC .. A61C 7/10; A61C 7/002; A61C 7/08; A61C 7/36; A61C 7/00
(Continued)

(56) References Cited

U.S. PATENT DOCUMENTS 5,002,485 A * 3/1991 Aagesen .................. A61C 7/00
                                                                  433/18
5,683,244 A    11/1997 Truax
(Continued)

FOREIGN PATENT DOCUMENTS

CN    204814232 U    12/2015
CN    106420077 A     2/2017
(Continued)

OTHER PUBLICATIONS

Apr. 10, 2018—(WO) Written Opinion and International Search Report—App PCT/AU2018/050161.
(Continued)

*Primary Examiner* — Yogesh P Patel
(74) *Attorney, Agent, or Firm* — Banner & Witcoff, Ltd.

(57) ABSTRACT

An orthodontic appliance comprising a shell shaped to receive a patient's teeth and to urge one or more teeth into a predetermined alignment and/or orientation, the shell including a jaw-biasing region which extends beyond the patient's internal gum line when the shell is worn over the patient's teeth, the jaw-biasing region being configured to apply a bias to the jaw to modify the shaping thereof. By modifying the shape of the jaw to accommodate the patient's repositioned teeth, the present orthodontic appliance may be able to reduce the likelihood and/or severity of orthodontic relapse, thereby achieving a more stable outcome for the patient.

15 Claims, 6 Drawing Sheets

(51) Int. Cl.
*A61C 7/08* (2006.01)
*A61C 7/36* (2006.01)

(58) Field of Classification Search
USPC .................................................. 433/7, 24
See application file for complete search history.

(56) References Cited

U.S. PATENT DOCUMENTS

| | | | | |
|---|---|---|---|---|
| 7,661,955 | B2 * | 2/2010 | Da Cruz | A61C 7/10 |
| | | | | 433/7 |
| 2014/0120490 | A1 * | 5/2014 | Borovinskih | A61C 7/36 |
| | | | | 433/6 |
| 2015/0245887 | A1 | 9/2015 | Izugami et al. | |
| 2016/0081769 | A1 * | 3/2016 | Kimura | A61C 7/10 |
| | | | | 433/6 |
| 2016/0184067 | A1 | 6/2016 | Parker | |
| 2017/0100215 | A1 | 4/2017 | Khour | |
| 2017/0135850 | A1 * | 5/2017 | Veis | A61C 7/10 |
| 2018/0153649 | A1 * | 6/2018 | Wu | G16H 40/67 |

FOREIGN PATENT DOCUMENTS

| | | | | |
|---|---|---|---|---|
| EP | 2574302 | B1 | 1/2016 | |
| WO | 2014/041222 | A1 | 3/2014 | |
| WO | WO-2016046798 | A1 * | 3/2016 | A61C 7/10 |
| WO | 2017/062634 | A1 | 4/2017 | |

OTHER PUBLICATIONS

Mar. 12, 2021—(CN) The First Office Action—App 201880053886. 2, Eng Tran.

Mar. 10, 2021—(EP) Extended EP Search Report—App 18819635. 6.

* cited by examiner

ORTHODONTIC APPLIANCE

FIELD OF THE INVENTION

The present invention relates generally to the field of orthodontics. In particular, the present invention relates to an orthodontic appliance for treating problems such as malocclusion.

BACKGROUND OF THE INVENTION

The straightening of a person's teeth for cosmetic and/or functional purposes has conventionally been achieved by traditional fixed orthodontic braces, typically including wires held together by brackets glued to a person's teeth. However, the use of such conventional braces is not without its shortcomings. Wire braces may be considered unsightly and can be a source of both physical and emotional pain and discomfort. Moreover, braces can impede upon dental hygiene and can make cleaning procedures such as brushing and flossing difficult, thereby increasing the risk of infection. Patients with inadequate oral hygiene may also develop white spot lesions on their teeth due to plaque building up around the braces and causing tooth decay.

Other orthodontic appliances have been developed partly in response to the above shortcomings, including products commonly referred to as "aligners" which are worn over a person's teeth in a manner not dissimilar to a mouthguard. While these aligners may be more visually appealing, they are often only suitable for minor corrections such as mildly crooked or protruding teeth. The efficacy of such aligners for treating more complex or severe cases of malocclusion—such as cross-bites, overbites, skeletally-based malocclusions, severely rotated teeth and large tooth-spacing—is generally less reliable and predictable. In these cases fixed orthodontic braces have hitherto been a more effective option.

A drawback of the aforementioned fixed orthodontic braces and aligners is that even if they manage to reposition teeth to their desired positions, orthodontic relapse may occur wherein the teeth drift away from those positions, and often towards their original positions. Patients typically have to wear retainers for months, years and even for the remainder of their lives in order to combat orthodontic relapse. This can be costly, inconvenient and requires extreme discipline on the patient's part to remember to wear their retainers on a regular basis.

Examples of the present invention seek to provide an orthodontic appliance which addresses or ameliorates at least one of the above disadvantages, or at least provides a useful alternative.

SUMMARY OF THE INVENTION

The aforementioned fixed orthodontic braces and aligners are typically configured to reposition a patient's tooth or teeth relative to the jaw without shaping the patient's jaw, which may contribute to orthodontic relapse. Accordingly, a first aspect of the present invention provides an orthodontic appliance comprising a shell shaped to receive a patient's teeth and to urge one or more teeth into a predetermined alignment and/or orientation, the shell including a jaw-biasing region which extends beyond the patient's internal gum line when the shell is worn over the patient's teeth, the jaw-biasing region being configured to apply a bias to the jaw to modify the shaping thereof. By modifying the shape of the jaw to accommodate the patient's repositioned teeth, the present orthodontic appliance may be able to reduce the likelihood and/or severity of orthodontic relapse, thereby achieving a more stable outcome for the patient. As such, it may be possible to reduce the duration and/or frequency with which a patient ought to wear a retainer after being treated with the present orthodontic appliance.

In one form of the invention the shell includes lateral shell portions secured to one another by way of an adjustment mechanism for adjusting a distance between the shell portions, wherein the shell portions can apply a greater bias against the patient's jaw and teeth by increasing the distance between the shell portions. As such, lateral expansion of the patient's jaw may be achieved by progressively increasing the distance between the lateral shell portions over time.

In certain embodiments of the invention, the shell may include a frontal shell portion secured to the lateral shell portions by way of an adjustment mechanism for adjusting a distance ("frontal distance") between the frontal shell portion and the lateral shell portions, wherein the frontal jaw-biasing region is configured to apply a greater forward bias against the patient's jaw and teeth by increasing the frontal distance. In these embodiments, the forward region of the patient's jaw may also be extended by progressively increasing the frontal distance over time.

In preferred embodiments of the invention, the adjustment mechanism includes an expansion screw that is securable to the respective jaw-biasing region of each shell portion. As such, the shell portions can simply be interconnected to one another via one or more expansion screws which themselves are easy to operate.

According to embodiments of the invention, the appliance may further comprise one or more anchor points to which a resilient band is attachable. An anchor point could, for example, be a hook which has been embedded into the appliance.

According to a second aspect of the invention, there is provided a system including two orthodontic appliances according to the first aspect of the invention, wherein the first appliance is configured to be worn over the patient's upper teeth, and the second appliance is configured to be worn over the patient's lower teeth, wherein a resilient band is attachable to an anchor point of each appliance, the band being configured to urge one worn appliance relative to the other such that the patient's upper and lower jaws are urged relative to one another towards a predetermined and/or acceptable position. In such a system, not only can the orthodontic appliances modify the shape of one or both jaws individually, the appliances can also work to alter the position of one jaw relative to the other to aid in the treatment of orthodontic issues not limited to overbites, underbites and crossbites.

According to a third aspect of the present invention, there is provided a method of treating malocclusion, comprising fitting a series of orthodontic appliances according to the first aspect of the invention to a patient in accordance with a treatment plan, the series of appliances being shaped so as to: successively urge one or more of the patient's teeth towards a predetermined and final alignment and/or orientation; and successively apply a bias to the patient's jaw to modify the shaping of the jaw towards a predetermined and final jaw shape.

According to a fourth aspect of the present invention, there is provided a kit of parts comprising a series of orthodontic appliances according to the first aspect of the invention, the appliances being configured to be worn by a patient in a consecutive order in accordance with a treatment plan, the series of consecutive appliances being configured to: successively urge one or more of the patient's teeth towards a predetermined and final alignment and/or orientation; and successively apply a bias to the patient's jaw to modify the shaping of the jaw towards a predetermined and final jaw shape.

BRIEF DESCRIPTION OF THE DRAWINGS

Further aspects, features and detailed of the invention may be better understood from the following description of several embodiments thereof, presented by way of non-limiting example only, and with reference to the accompanying drawings in which.

DETAILED DESCRIPTION

Figure 1:
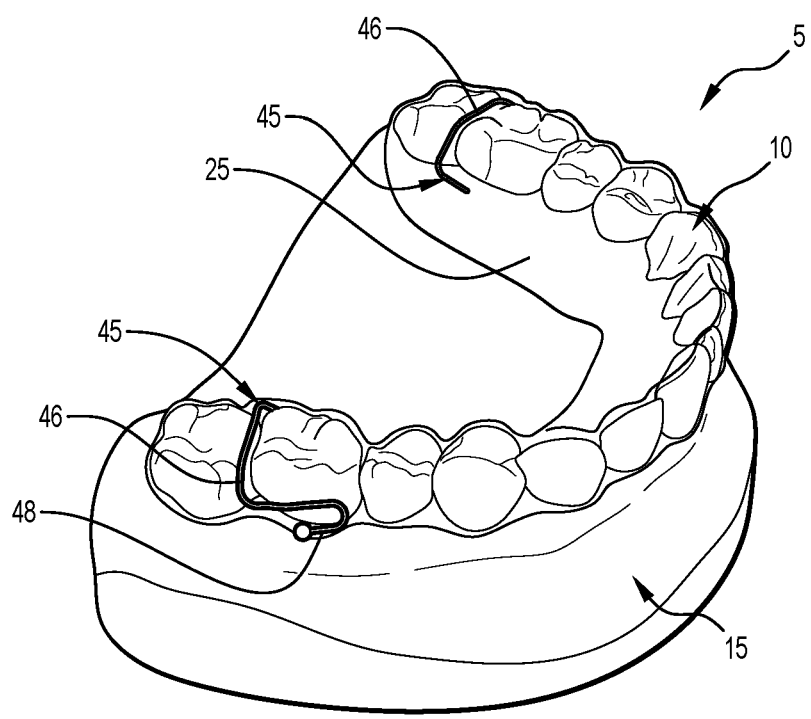
FIG. 1 is a side perspective view of an orthodontic appliance according to a first embodiment as worn on a model of a jaw.
Figure 2:
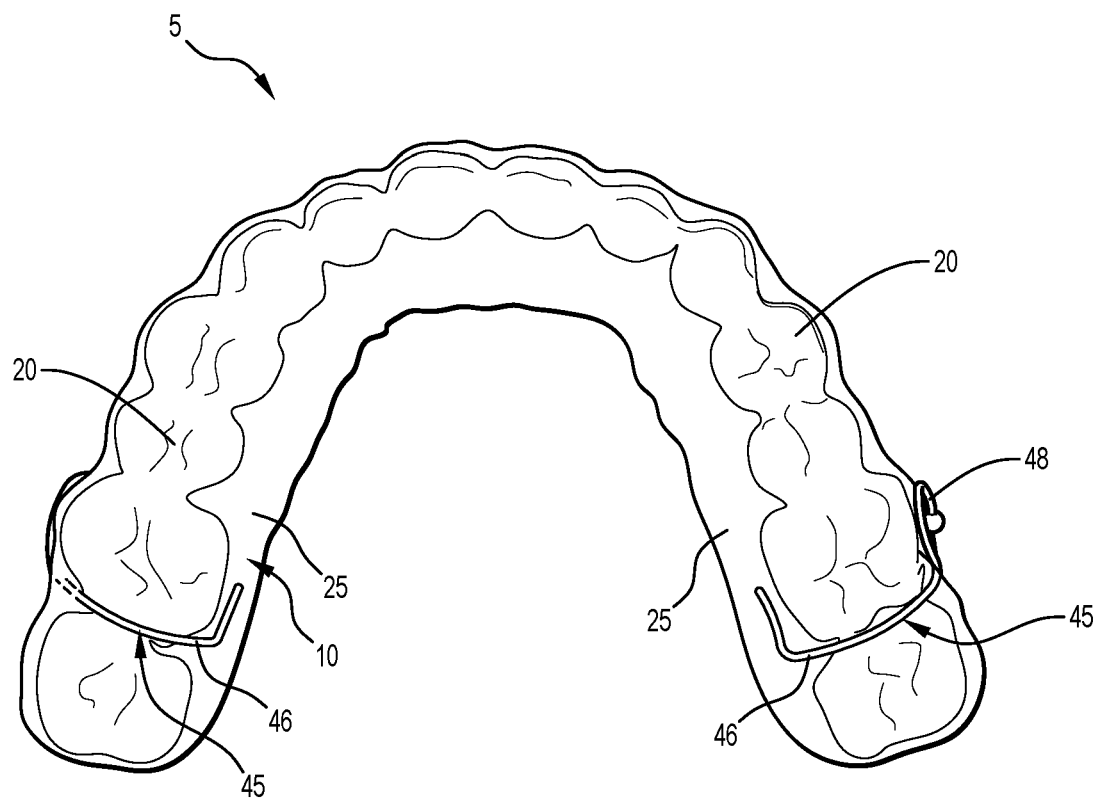
FIG. 2 is a bottom view of the orthodontic appliance of FIG. 1.
Figure 3:
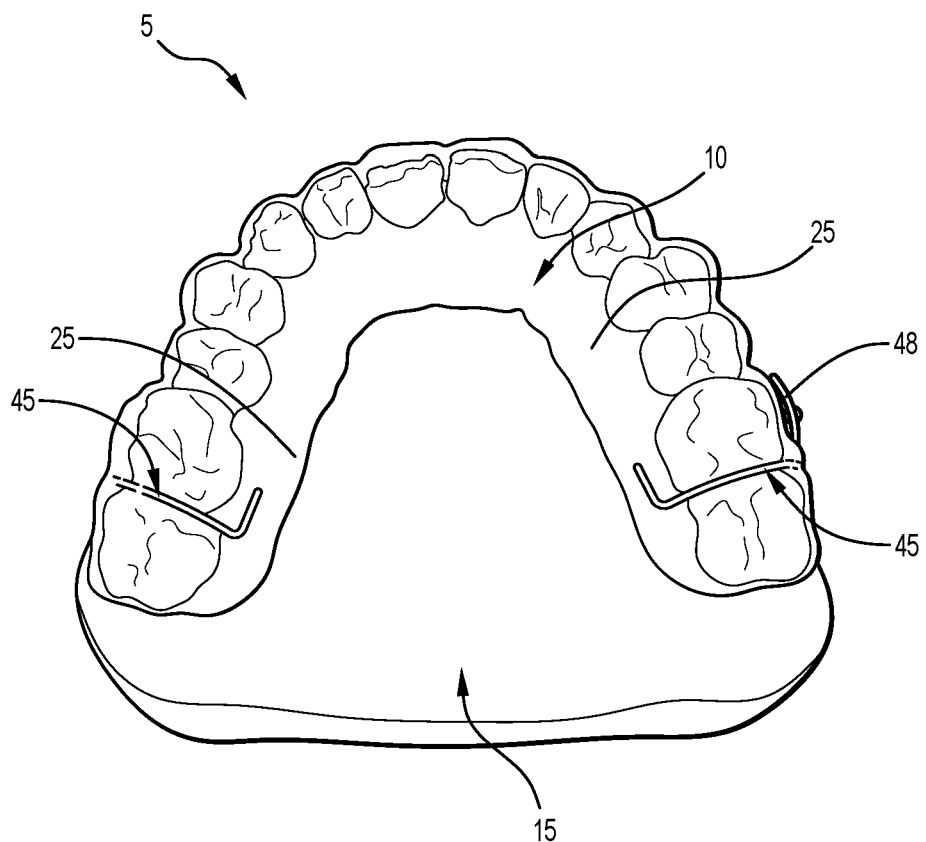
FIG. 3 is a top view of the arrangement shown in FIG. 1.

FIGS. 1 to 3 show an orthodontic appliance 5 according to a first embodiment of the present invention. The appliance 5 comprises a shell 10 made from a substantially clear material that is relatively strong, provides a degree of flexibility and is generally hypoallergenic and biologically stable. The depicted shell 10 is made from a medical grade plastic comprising mostly of polyurethane. Other materials may alternatively be used, as will be recognised by those of ordinary skill in the art.

With reference to FIG. 2, the underside of the shell 10 is shaped to receive a patient's teeth. The shell 10 may be formed via conventional techniques, which can involve first producing a mould of the patient's teeth, and then casting a physical model 15 from the mould. Examples of such physical models 15 may be seen in FIGS. 1 and 3 to 5. A digital representation can then be generated by scanning the physical model 15. Alternatively, a digital representation of the patient's mouth can be obtained by scanning the patient's mouth directly, using conventional three-dimensional intraoral imaging techniques. A physical model may then be created using a three-dimensional printer.

A digital representation of the patient's mouth can be digitally manipulated to create a sequence of representations wherein the patient's teeth are progressively shifted from their initial positions towards their desired and final positions. For example, each digital representation in the sequence may be manipulated to successively move the patient's teeth by up to 0.025 mm towards their final positions. A sequence of orthodontic appliances 5 each comprising a distinct shell 10 can thus be produced based on the sequence of digitally manipulated representations. For example, the digital representations in the sequence can be used to produce successive positive models and each shell 10 of the orthodontic appliance 5 can be produced as a negative of the respective positive model using vacuum fabrication techniques. The positive models of the digitally manipulated representations of the patient's teeth can be formed by 3D printing techniques. Moreover, the 3D-printed model can also be printed with markings to indicate to a technician how far a jaw-biasing region 25 of the appliance 5 should extend (described further hereinbelow).

The resulting shell 10 thus comprises recesses 20 (see FIG. 2) shaped to receive the patient's teeth. The close fit between the shell 10 and the patient's teeth is such that at least some of the teeth will serve as anchor points to help retain the appliance 5 within the patient's mouth. Of course, since the orthodontic appliance 5 has been produced based on a digitally altered representation of the patient's teeth, one or more of the shell's altered recesses 20 will apply a bias against respective teeth so as to urge them towards their predetermined alignment and/or orientation.

Referring to FIGS. 1 to 3, the shell 10 also includes a jaw-biasing region 25 which is configured to apply a bias to the jaw to modify the shaping thereof. In the depicted embodiment, the jaw-biasing region 25 is in the form of a peripheral skirt which extends beyond the patient's internal gum line when the shell 10 is worn over the patient's teeth. The jaw-biasing region 25 can also be formed in accordance with techniques described above. As such, the digital representation of the patient's mouth can also be digitally manipulated to create a sequence of representations wherein the patient's jaw is progressively modified towards the jaw's desired and final position and/or shape. The resulting sequence of shells 10 thus include a jaw-biasing region 25 configured to apply a bias against the patient's jaw so as to progressively modify the shaping of the jaw. For example, with reference to FIGS. 1 and 3, the peripherally extending jaw-biasing region 25 can be configured to apply an outwardly directed bias against the patient's sublingual fossa so as expand the patient's jaw and thereby accommodate the desired positioning of the teeth.

As explained above, the shell 10 may conveniently be formed using vacuum fabrication on a digitally manipulated positive model of the patient's dentition. This may involve heating and vacuum forming plastic sheet material over the physical model, and then trimming the formed plastic of excess material once hardened. To assist a technician in trimming the shell to the correct extent, the positive model can be created with a groove or ridge, for example, which creates a visible demarcation on the formed plastic to indicate where to cut. This is particularly pertinent with respect to the jaw-biasing region 25 for indicating to the technician how far the jaw-biasing region should extend beyond the patient's inner gum line.

Figure 4:
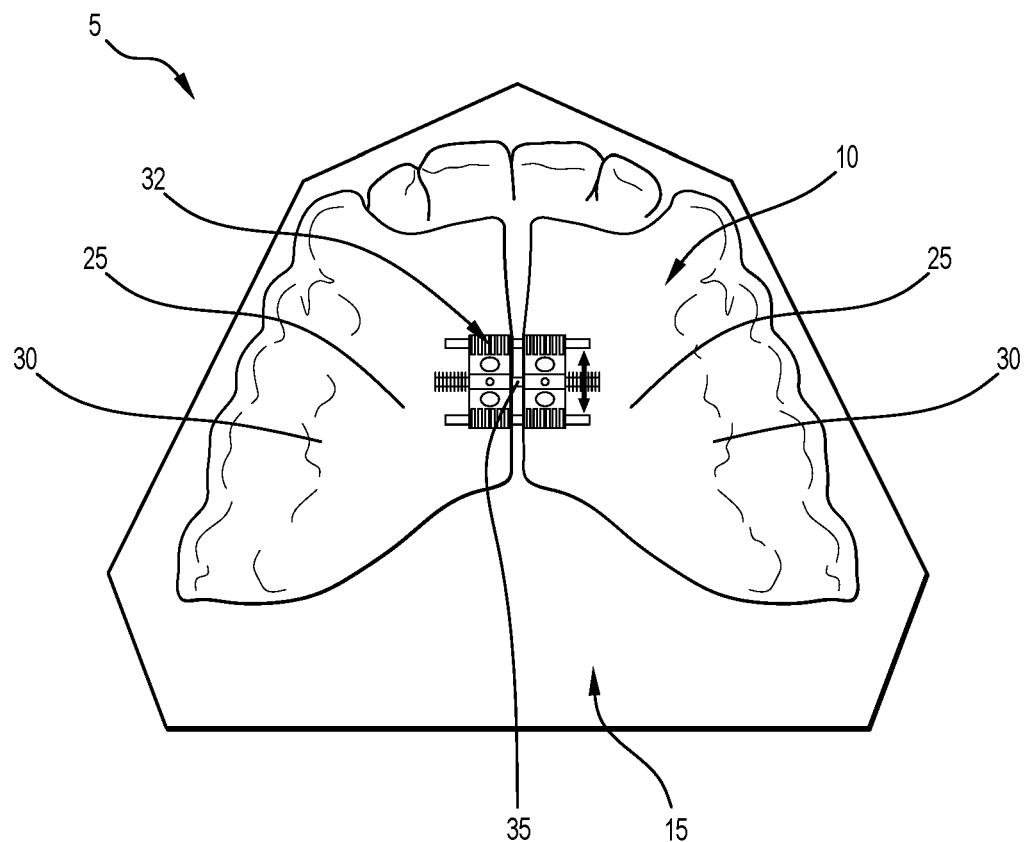
FIG. 4 is a top view of an orthodontic appliance according to a second embodiment as worn on a model of a jaw.

A second embodiment of an orthodontic appliance 5 is shown in FIG. 4 (fitted on a physical model 15). In this embodiment, the shell 10 includes two lateral shell portions 30, each having recesses 20 shaped to receive the patient's teeth. Each lateral shell portion 30 also includes a jaw-biasing region 25 configured to urge against the patient's jaw. The lateral shell portions 30 are secured to one another via an adjustment mechanism 32 including an expansion screw 35. The adjustment mechanism has respective anchors embedded within or bonded to the jaw-biasing regions 25 of the lateral shell portions 30 and the expansion screw 35 is operable to adjust the distance therebetween. For example, rotating the screw 35 in one direction will increase the distance between the shell portions 30, thereby causing them to apply a greater outwardly directed bias against the patient's teeth and jaw. As the patient's teeth and jaw gradually shift towards their desired positions and/or arrangement (and thus the bias force exerted by the shell lessens), the expansion screw 35 can be adjusted yet again to increase the distance between the lateral shell portions 30 to increase the force with which the shell portions 30 urge against the patient's teeth and jaw. If the distance between the lateral shell portions 30 is too great and causes the patient discomfort, the screw 35 can simply be rotated in the opposite direction to decrease the distance between the lateral shell portions 30.

Figure 5:
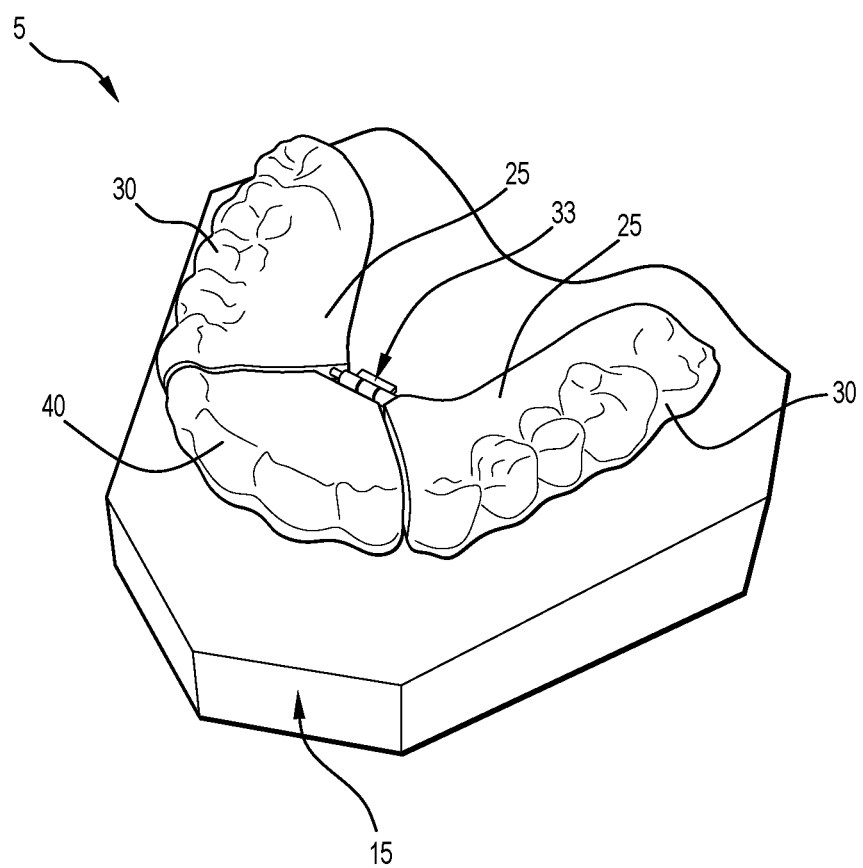
FIG. 5 is a front perspective view of an orthodontic appliance according to a third embodiment as worn on a model of a jaw.
Figure 6:
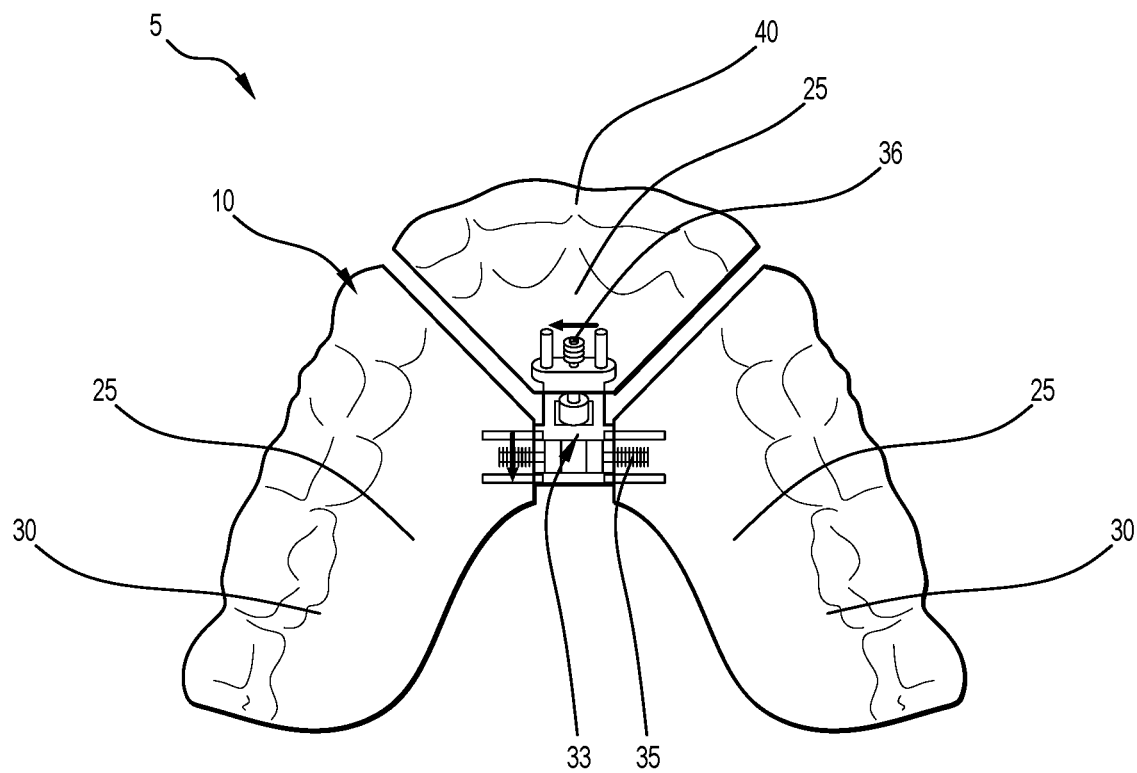
FIG. 6 is a top view of the orthodontic appliance of FIG. 6.

FIGS. 5 and 6 show an orthodontic appliance 5 according to a third embodiment of the present invention. In this embodiment the shell 10 comprises three sections, two lateral shell portions 30 and a frontal shell portion 40. The three sections are interconnected via a three directional adjustment mechanism 33 having first and second generally orthogonal expansion screws 35, 36 acting between anchors embedded within or bonded to the respective lateral shell portions and frontal shell portion. Like the second embodiment, the distance between the lateral shell portions 30 can be adjusted by operating the expansion screw 35. The expansion screw 36 is also operable to adjust the distance ("frontal distance") between the frontal shell portion 40 and the two lateral shell portions 30. By increasing the frontal distance, a jaw-biasing region of the frontal portion 40 can apply a greater bias against a forward region of the jaw and the corresponding front teeth.

It is of course possible for a patient to wear two of the present orthodontic appliances 5—one over the upper teeth and one over the lower teeth. Moreover, the two appliances 5 can also work together to urge the patient's jaws relative to one another. To this end, each appliance 5 may be constructed with a pair of anchoring devices 45 embedded into or bonded to the material, one on each side of the shell 10. Examples of such anchoring devices 45 can be seen in FIGS. 1 to 3 in the form of wire sections 46 embedded within the material of the shell 10, each terminating in a hook 48 located to the outer side of the appliance. The hook 48 preferably has a rounded end and is arranged to lie substantially against the material of the shell 10 so as to avoid unnecessary irritation of the patient's mouth. The anchoring devices 45 of the upper appliance would typically be offset in a forward or backward direction with respect to the anchoring devices of the lower appliance, and with the respective hooks oppositely oriented. Resilient bands can thus be attached between a hook 48 in the upper appliance and a corresponding hook in the lower appliance, such that, when the appliances are worn, the bands work to urge one appliance relative to the other such that the patient's upper and lower jaws are urged relative to one another and towards a predetermined position.

Although the foregoing has referred to the repositioning of a plural number of teeth, the present orthodontic appliance can clearly be adapted to reposition a single tooth.

While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiments.

Throughout this specification and the claims which follow, unless the context requires otherwise, the word "comprise", and variations such as "comprises" or "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as, an acknowledgement or admission or any form of suggestion that that prior publication (or information derived from it) or known matter forms part of the common general knowledge in the field of endeavour to which this specification relates.

The invention claimed is:

1. An orthodontic appliance comprising a shell shaped to receive a patient's teeth and to urge one or more teeth into a predetermined alignment and/or orientation, the shell including a jaw-biasing region in the form of a peripheral skirt which extends downward beyond the patient's internal gum line when the shell is worn over the patient's teeth, the jaw-biasing region being configured to apply a bias to the jaw to modify the shaping thereof,
wherein the shell includes lateral shell portions secured to one another via an adjustment mechanism for adjusting a distance between the shell portions, and wherein the shell portions apply a greater bias against the patient's jaw and teeth by increasing the distance between the shell portions.

2. The appliance of claim 1, wherein the shell includes a frontal shell portion secured to the lateral shell portions via the adjustment mechanism for adjusting a frontal distance between the frontal shell portion and the lateral shell portions, and wherein the frontal jaw-biasing region is configured to apply a greater forward bias against the patient's jaw and teeth by increasing the frontal distance.

3. The appliance of claim 1, wherein the adjustment mechanism includes an expansion screw.

4. The appliance of claim 3, wherein the expansion screw is secured to the respective jaw-biasing region of each shell portion.

5. The appliance of claim 1, further comprising one or more anchor points to which a resilient band is attachable.

6. The appliance of claim 5, wherein the anchor points comprise hooks embedded in the appliance.

7. The appliance of claim 1, wherein said peripheral skirt is configured to contact the patient's mouth beyond the patient's internal gum line and thereby to apply a bias to the jaw to modify the shaping thereof.

8. A system including two orthodontic appliances according to claim 1, wherein a first appliance is configured to be worn over the patient's upper teeth, and a second appliance is configured to be worn over the patient's lower teeth, and wherein a resilient band is attachable to an anchor point of each appliance, the band being configured to urge one worn appliance relative to the other such that the patient's upper and lower jaws are urged relative to one another towards a predetermined position.

9. A method of treating malocclusion, comprising fitting a series of orthodontic appliances, each including an orthodontic appliance according to claim 1, the series of orthodontic appliances being shaped to a patient in accordance with a treatment plan, the series of appliances being shaped so as to:
successively urge one or more of the patient's teeth towards a predetermined and final alignment and/or orientation; and
successively apply a bias to the patient's jaw to modify the shaping of the jaw towards a predetermined and final jaw shape.

10. A kit of parts comprising a series of orthodontic appliances, each including an orthodontic appliance according to claim 1, the appliances being configured to be worn by a patient in a consecutive order in accordance with a treatment plan, the series of consecutive appliances being configured to:

successively urge one or more of the patient's teeth towards a predetermined and final alignment and/or orientation; and successively apply a bias to the patient's jaw to modify the shaping of the jaw towards a predetermined and final jaw shape.

11. A method of orthodontic treatment comprising:

modelling a patient's mouth including teeth positions and jaw shape;

determining, using the patient's mouth model, an orthodontically corrected configuration of teeth positions and jaw shape for the patient;

producing a series of orthodontic appliances each comprising an appliance according to claim 1 configured in step-wise sequence to modify the shaping of the patient's jaw toward the orthodontically corrected configuration; and fitting the orthodontic appliances to the patient for use in sequence according to a treatment plan, whereby the patient's teeth positions and jaw shape are modified.

12. A method according to claim 11 wherein the modelling of a patient's mouth comprises generating a digital representation.

13. A method according to claim 12 wherein the determining an orthodontically corrected configuration of teeth positions and jaw shape includes digitally manipulating the digital representation to create a sequence of representations wherein the patient's teeth positions and jaw shape are progressively modified, and wherein the series of orthodontic appliances is produced using the sequence of representations.

14. A method according to claim 11 wherein the shell includes lateral shell portions secured to one another via an adjustment mechanism for adjusting a distance between the shell portions, and wherein the shell portions apply a greater bias against the patient's jaw and teeth by increasing the distance between the shell portions.

15. A method according to claim 14 wherein the shell includes a frontal shell portion secured to the lateral shell portions via the adjustment mechanism for adjusting a frontal distance between the frontal shell portion and the lateral shell portions, and wherein the frontal jaw-biasing region is configured to apply a greater forward bias against the patient's jaw and teeth by increasing the frontal distance.

* * * * *